United States Patent [19]

Burns et al.

[11] Patent Number: 5,587,408
[45] Date of Patent: Dec. 24, 1996

[54] SOLID ERASABLE MARKING COMPOSITION

[75] Inventors: Barbara J. Burns, Auburn; Ralph J. Shuman, Needham, both of Mass.

[73] Assignee: Avery Dennison Corporation, Pasadena, Calif.

[21] Appl. No.: 307,285

[22] Filed: Sep. 16, 1994

[51] Int. Cl.$^6$ .................................................. C09D 11/00
[52] U.S. Cl. ..................... 523/160; 523/161; 524/270; 524/394; 106/19 A; 106/19 B; 106/20 A; 106/22 B
[58] Field of Search .................... 524/394, 395, 524/270; 523/161, 160; 106/19 A, 19 B, 19 E, 20 A, 22 B, 27 R

[56] References Cited

U.S. PATENT DOCUMENTS

| | | | |
|---|---|---|---|
| 4,170,578 | 10/1979 | Schelhaas | 524/49 |
| 4,170,669 | 10/1979 | Okada | 106/19 A |
| 4,193,906 | 3/1980 | Hatanaka | 523/161 |
| 4,212,676 | 7/1980 | Ueda | 106/19 |
| 4,297,260 | 10/1981 | Ferree, Jr. et al. | 523/161 |
| 4,585,815 | 4/1986 | Ono et al. | 524/23 |
| 4,596,846 | 6/1986 | Bohne et al. | 524/173 |
| 4,702,916 | 10/1987 | Geria | 424/400 |
| 4,716,189 | 12/1987 | Gollub et al. | 524/394 |
| 4,721,739 | 1/1988 | Brenneman et al. | 523/161 |
| 4,753,658 | 6/1988 | Okuzono et al. | 106/22 |
| 4,755,550 | 7/1988 | Shuman et al. | 524/270 |
| 4,940,628 | 7/1990 | Lin et al. | 428/201 |
| 4,946,301 | 8/1990 | Palm | 524/270 |
| 4,954,544 | 9/1990 | Chandaria | 524/111 |
| 5,004,763 | 4/1991 | Imagawa | 523/161 |
| 5,082,495 | 1/1992 | Iijima | 106/21 |
| 5,120,359 | 6/1992 | Uzukawa et al. | 106/20 |
| 5,147,457 | 9/1992 | Hino et al. | 106/19 A |
| 5,203,913 | 4/1993 | Yamamoto et al. | 106/22 B |
| 5,217,255 | 6/1993 | Lin et al. | 524/270 |
| 5,300,538 | 4/1994 | Loftin | 523/161 |
| 5,338,793 | 8/1994 | Loftin | 523/160 |
| 5,362,167 | 11/1994 | Loftin | 523/161 |

FOREIGN PATENT DOCUMENTS 2076318  9/1993  Canada.

*Primary Examiner*—Tae Yoon
*Attorney, Agent, or Firm*—Kriegsman & Kriegsman

[57] ABSTRACT

A solid marking composition that is erasable from both porous and non-porous marking susbtrates. The solid erasable marking composition comprises (a) an emulsion, the emulsion comprising a discontinuous polymeric phase and a continuous aqueous phase, the emulsion being characterized by its ability to be transformed, upon being contacted with the surface of a porous or non-porous marking substrate, from a first state in which the emulsion is stable to a second state in which the emulsion is unstable and the discontinuous polymeric phase rapidly agglomerates to form a deposit on the surface of the marking substrate with low adhesion thereto; (b) a colorant, the colorant being characterized by its association with the deposit when the emulsion is transformed into the second state; and (c) a shape-giving gel-forming agent, the shape-giving gel-forming agent being a salt of an aliphatic carboxylic acid having from 8 to 36 carbon atoms.

12 Claims, No Drawings

SOLID ERASABLE MARKING COMPOSITION

BACKGROUND OF THE INVENTION

The present invention relates generally to erasable marking compositions and more particularly to solid erasable marking compositions.

Traditionally, erasable marking compositions, e.g., highlighting inks, writing inks and correction fluids, have been provided in liquid form, as organic or aqueous solutions. In many instances, the erasability of such liquid marking compositions from conventional porous marking substrates, e.g., conventional stationery-type paper, has been achieved by including in the marking composition a component which is capable of forming a film on the the porous marking substrate in such a way as to prevent the colorant present in the marking composition from penetrating the porous marking substrate. Often, the film-forming component is a polymeric material, the polymeric material and the colorant being incorporated into an emulsion and being carefully selected so that, when the composition is applied to a porous marking substrate, the emulsion breaks causing (1) the continuous phase of the emulsion to evaporate and/or to be absorbed by the porous marking substrate, (2) the polymeric film-forming material to form a film on the surface of the porous marking substrate and (3) the colorant to associate itself with the film, as opposed to being associated with the continuous phase of the emulsion absorbed by the porous marking substrate. In this manner, the colorant can readily be removed from the substrate by stripping the film from the porous marking substrate using an ordinary pencil eraser.

To promote association of the colorant with the cohesive film, many existing liquid erasable marking compositions have exploited either (a) a charge attraction between the colorant and the polymeric film-forming material; or (b) a common hydrophobicity or hydrophilicity between the colorant and the polymeric film-forming material relative to the continuous phase of the emulsion. An example of a liquid marking composition which achieves erasability by virtue of a charge attraction between its colorant and its polymeric film-forming material is disclosed in U.S. Pat. No. 4,297,260, inventors Ferree, Jr. et al., which is incorporated herein by reference. In the aforementioned patent, there is described an erasable writing medium composition suitable for use in porous tip and ballpoint pens, the composition comprising an emulsion having a discontinuous phase of a carboxylated styrene-butadiene latex copolymer, a continuous phase of water, and a basic dye. It is stated in the foregoing patent that erasability is achieved with the foregoing composition because the majority of positively charged basic dye ions form a surface layer on the negatively charged carboxylated polymer particles of the emulsion, with only a small portion of the dye ions becoming dissolved in the continuous phase.

An example of a liquid marking composition which achieves erasability by virtue of a common hydrophobocity between its colorant and its polymeric film-forming material is disclosed in Canadian Patent Application No. 2,076,318, which was published Sep. 24, 1993, and which is incorporated herein by reference. In the aforementioned published patent application, there is described an erasable writing medium composition suitable for use in porous-tipped writing instruments, ballpoint and fountain pens, and paints, the composition comprising an emulsion having a discontinuous phase of a non-carboxylated styrene-butadiene latex copolymer, a continuous phase of water, and a water-insoluble pigment.

Additional liquid erasable marking compositions of interest are described in the following patents and patent applications, all of which are incorporated herein by reference: U.S. Pat. No. 5,217,255, inventors Lin et al., which issued Jun. 8, 1993; U.S. Pat. No. 4,940,628, inventors Lin et al., which issued Jul. 10, 1990; U.S. Pat. No. 5,203,913, inventors Yamamoto et al., which issued Apr. 20, 1993; U.S. Pat. No. 4,596,846, inventors Bohne et al., which issued Jun. 24, 1986; U.S. Pat. No. 5,120,359, inventors Uzukawa et al., which issued Jun. 9, 1992; U.S. Pat. No. 4,721,739, inventors Brenneman et al., which issued Jan. 26, 1988; U.S. Pat. No. 5,082,495, inventor Iijima, which issued Jan. 21, 1992; U.S. Pat. No. 5,004,763, inventor Imagawa, which issued Apr. 2, 1991; U.S. Pat. No. 4,753,658, inventors Okuzono et al., which issued Jun. 28, 1988; U.S. Pat. No. 4,389,499, inventor Riesgraf, which issued Jun. 21, 1983; U.S. Pat. No. 4,390,646, inventor Ferguson, which issued Jun. 28, 1983; U.S. Pat. No. 4,391,927, inventor Farmer, III, which issued Jul. 5, 1983; U.S. Pat. No. 4,687,791, inventors Miyajima et al., which issued Aug. 18, 1987; U.S. Pat. No. 4,738,725, inventors Daugherty et al., which issued Apr. 19, 1988; U.S. Pat. No. 4,760,104, inventors Miyajima et al., which issued Jul. 26, 1988; Japanese Patent No. 5-214285, inventors Kouji et al., which issued Aug. 24, 1993; PCT Application No. PCT/US92/11127, inventor Loftin, which was published Jun. 24, 1993; European Patent Application 556,668, inventors Koji et al., which was published Aug. 25, 1993; PCT Application No. PCT/US93/10231, inventors Smith et al., which was published May 11, 1994; and commonly-assigned U.S. patent application Ser. No. 08/264,565, inventor Smith, filed Jun. 23, 1994.

In addition to the above-described liquid erasable marking compositions, a solid erasable marking compositions adapted for use on paper substrates and removable with an ordinary pencil eraser is described in U.S. Pat. No. 5,300,538, inventor Loftin, which issued Apr. 5, 1994 and which is incorporated herein by reference. The composition of the aforementioned patent comprises, in a preferred embodiment, a styrene-ethylene/butylene-styrene block copolymer, a blend of waxes, a fluorescent pigment, an oil, a fatty acid, e.g., stearic acid, and a softening agent, e.g., petrolatum or natural or synthetic lanolin. The composition is preferably made by first mixing the pigment into the oil, then heating the wax, or waxes, with the block copolymer, while stirring, until both are melted, forming a clear molten liquid, and, finally, adding the pigment/oil mixture to molten liquid and mixing until homogeneous. To form the marker, the homogeneous mixture is poured into a mold and allowed to solidify. The molds are preferably first treated with a release agent, e.g., potassium stearate, to facilitate removal of the solidified composition.

Additional solid erasable marking compositions are disclosed in the following patents, both of which are incorporated herein by reference: U.S. Pat. No. 4,193,906, inventor Hatanaka, which issued Mar. 18, 1980; and U.S. Pat. No. 4,212,676, inventor Ueda, which issued Jul. 15, 1980. The solid erasable marking compositions of the aforementioned two patents are not adapted for use on conventional writing paper, but rather, are adapted for use on smooth-surfaced writing panels, e.g., metal panels, glass panels and the like, and are readily erasable therefrom with a dry eraser, such as a blackboard eraser, dry fabric, paper or the like.

Other patents of possible interest, all of which are incorporated by reference, include U.S. Pat. No. 3,576,776, inventors Muszik et al., which issued Apr. 27, 1971; U.S.

Pat. No. 4,755,550, inventors Shuman et al., which issued Jul. 5, 1988; U.S. Pat. No. 4,954,544, inventor Chandaria, which issued Sep. 4, 1990; and U.S. Pat. No. 4,946,301, inventor Palm, which issued Aug. 7, 1990. The foregoing patents do not relate to erasable marking compositions, but rather, relate to solid adhesive compositions.

SUMMARY OF THE INVENTION

It is an object of the present invention to provide a novel solid erasable marking composition.

It is another object of the present invention to provide a novel solid erasable marking composition that can readily be applied to conventional porous marking substrates and that can readily be removed from such conventional porous marking substrates using an ordinary pencil eraser. For purposes of the present specification and claims, the expression "conventional porous marking substrate" is defined to mean a marking substrate which is sufficiently porous to permit the penetration thereinto of colorants of the type typically found in conventional non-erasable inks and which is treated in such a manner that, when contacted with water, ions (e.g., protons and/or cations) are dissolved therefrom. Examples of conventional porous marking substrates include, but are not limited to, conventional stationery-type papers.

It is still another object of the present invention to provide a solid erasable marking composition as described above that can also be readily applied to and erased from non-porous marking substrates including, but not limited to, glass panels, plastic panels, metal panels, wood panels, coated paper surfaces and other smooth-surfaced writing panels. Erasure of a mark made by the present composition from such non-porous marking substrates may be achieved using an ordinary pencil eraser, a dry cloth, a tissue or the like.

In furtherance of the above and other objects to be described or to become apparent below, there is hereinafter provided a solid marking composition that is erasable from both porous and non-porous marking substrates, the solid marking composition comprising: (a) an emulsion, said emulsion comprising a discontinuous polymeric phase and a continuous aqueous phase, said emulsion being characterized by its ability to be transformed, upon being contacted with the surface of a porous or non-porous marking substrate, from a first state in which said emulsion is stable to a second state in which said emulsion is unstable and said discontinuous polymeric phase rapidly agglomerates to form a deposit on the surface of the porous or non-porous marking substrate with low adhesion thereto; (b) a colorant, said colorant being characterized by its association with said deposit when said emulsion is transformed into said second state; and (c) a soap-based, shape-giving, gel-forming agent, said shape-giving gel-forming agent preferably being a salt of an aliphatic carboxylic acid having from 8 to 36 carbon atoms.

The solid erasable marking composition of the present invention is preferably in a solid stick form disposed in an applicator, such as a reclosable tube dispenser.

Additional objects, features and advantages of the present invention will be set forth in part in the description which follows, and in part will be obvious from the description or may be learned by practice of the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

As mentioned above, the present invention is directed to a novel solid marking composition that is erasable from both porous and non-porous marking susbtrates. Although described below in greater detail, the solid erasable marking composition of the present invention comprises, in broad terms, (a) an aqueous emulsion of a polymeric, deposit-forming material; (b) a colorant; and (c) a soap-based, shape-giving, gel-forming agent.

The emulsion of the present composition comprises a discontinuous polymeric phase and a continuous aqueous phase, the emulsion being characterized by its ability to be transformed, upon being contacted with the surface of a marking substrate (preferably a conventional porous marking substrate), from a first state in which the emulsion is stable to a second state in which the emulsion is unstable and the discontinuous polymeric phase rapidly agglomerates to form a deposit, e.g., a film, on the surface of the marking substrate with low adhesion thereto. As can readily be appreciated, a wide variety of emulsions may be employed in the present composition For instance, said emulsion may be an aqueous dispersion of a polymeric material selected from the group consisting of olefinic polymers, copolymers of olefins and diolefins and condensation polymers, said olefinic polymers including polymers and copolymers of unsaturated hydrocarbons, unsaturated hydrocarbon acids, unsaturated hydrocarbon alcohols, unsaturated hydrocarbon aldehydes and unsaturated hydrocarbon ketones, said condensation polymers including polyesters, polyethers, polyamines, polyamides and polyurethanes. Preferred emulsions include aqueous dispersions of a polymeric material selected from the group consisting of homopolymers and copolymers of acrylonitrile, butadiene, chloroprene, isoprene, vinyl alcohol, alkyl acrylates, alkyl methacrylates, styrene, vinyl acetate, vinyl chloride, vinylidene chloride, saturated or unsaturated diols or polyols, saturated or unsaturated dicarboxylic acids or esters, and diisocyanates. Examples of emulsions of the type described above are disclosed in the art incorporated herein by reference and are disclosed below in the Examples which follow. Typically, the composition will include about 10–50%, by weight, of the polymeric material. Too little of the polymeric material may prevent the composition from erasing properly, while too much may make the composition in stick form less spreadable on the marking substrate.

The colorant of the present composition is characterized by its association with the deposit, as opposed to the continuous aqueous phase, when the emulsion is transformed into its second state, e.g., when the emulsion breaks as a result of being contacted with the surface of a conventional porous marking substrate. As can readily be appreciated, a wide variety of colorants may be employed in the present composition, and examples of specific colorants suitable for use in the present composition are disclosed in the art incorporated herein by reference and are disclosed below in the Examples which follow. Typically, the composition will include about 1–2%, by weight, of the colorant.

It should be noted, however, that the selection of a suitable colorant for any given composition will be dependent upon the type of emulsion selected for the composition since one wants to ensure that the colorant will preferentially associate itself with the resin than with the aqueous phase. To illustrate, a water-soluble acid dye would be a good colorant for use in a composition comprising an aqueous emulsion of acid pH which includes an acrylic polymer, and a water-soluble basic dye would be a good colorant for use in a composition comprising an aqueous emulsion of basic pH which includes a carboxylated styrene-butadiene copolymer. Similarly, a water-insoluble pigment would be a good colorant for use in a composition comprising an aqueous emulsion of a non-carboxylated styrene-butadiene copolymer. However, a water-soluble basic dye would not be a good colorant for use in the aforementioned composition comprising the acrylic emulsion nor would a water-soluble acid dye be a good colorant for use in the aforementioned composition comprising the carboxylated styrene-butadiene emulsion since, in both of these examples, the colorant will have a greater affinity for the aqueous phase than for the resin.

The soap-based, shape-giving, gel-forming agent of the present composition is a salt, preferably an alkali, ammonium or lower alkylamine salt, of an aliphatic carboxylic acid having from 8 to 36 carbon atoms. The aforementioned aliphatic carboxylic acids may be either branched or straight chain and may contain double bonds or single substituents, such as chloro or bromo. Preferably, the aliphatic carboxylic acids should be alkanoic acids, alkenoic acids, alkadienoic acids and their monohalogen substituted acids, and particularly, fatty acids with 12 to 22 carbon atoms. Sodium stearate is a preferred shape-giving gel-forming agent. It is to be understood that either a single species or a combination of species selected from the above-identified group of shape-giving gel-forming agents may be used as the shape-giving gel-forming agent. Typically, the composition will include about 5–15% (preferably about 10–15%), by weight, of the shape-giving gel-forming agent. Too little of the soap-based, shape-giving, gel-forming agent may make the composition too soft, while too much may make the composition too hard.

The solid erasable marking composition of the present invention preferably also includes a tackifier, which is used to improve adhesion between the composition and the surface of the marking substrate. Preferably, the composition of the present invention includes up to 40% (preferably about 18.5%), by weight, of the tackifier. The present composition also preferably includes up to 6% (preferably about 3–6%), by weight, of a humectant, up to about 6%, by weight, of an antioxidant and/or an antioxidant and antiozinant, and up to about 1.5%, by weight, of a fluorochemical surfactant.

The present composition may additionally include other additives of the type commonly employed in marking compositions, such as, but not limited to, preservatives, coalescing agents, antimicrobial agents, antifoam agents, anticorrosive agents, release agents, and the like. Examples of the aforementioned additives are disclosed in the patents, publications and patent applications incorporated herein by reference and/or are identified below in the Examples which appear below.

The following examples are illustrative only and should in no way limit the scope of the present invention:

EXAMPLE 1

A solid erasable marking composition was made using the formulation indicated below.

| Material | % By Weight | Weight (g) |
|---|---|---|
| NC-407 (a natural rubber latex, aqueous-based emulsion - 62% solids - low Tg) | 75.97 | 89.00 |
| Glycerine (humectant) | 5.55 | 6.50 |
| TINOX WLE (antioxidant and antiozinant) | 2.77 | 3.25 |
| TIZATE B (antioxidant) | 2.48 | 2.90 |
| FC-129 (anionic fluorochemical surfactant - potassium fluoralkyl carboxylate) | 1.49 | 1.75 |
| UNISPERSE BP-1 (water insoluble pigment) | 1.49 | 1.75 |
| Sodium stearate | 10.24 | 12.00 |

Instructions for Preparation

1. At room temperature, the above-indicated quantities of glycerine, TINOX WLE, TIZATE B, FC-129 and UNISPERSE BP-1, in that order, were added to the above-indicated quantity of NC-407.
2. The mixture was stirred and its temperature raised to approximately 175°–190° F.
3. With the mixture maintained at the aforementioned elevated temperature, the above-indicated quantity of sodium stearate was added thereto, and the mixture was stirred for 30–45 minutes.
4. The mixture was then poured into a reclosable tube dispenser, covered and allowed to cool to room temperature.

The resulting composition, which was somewhat soft in its physical form, was applied to a sheet of conventional stationery-type paper to form a mark. The mark was removable by the conventional action of an ordinary pencil eraser.

EXAMPLE 2

A composition of the formulation indicated below was prepared in the same manner as the composition of Example 1.

| Material | % By Weight | Weight (g) |
|---|---|---|
| NC-407 | 72.27 | 89.0 |
| Glycerine | 5.28 | 6.50 |
| TINOX WLE | 2.64 | 3.3 |
| TIZATE B | 2.35 | 2.9 |
| FC-129 | 1.42 | 1.75 |
| UNISPERSE BP-1 | 1.42 | 1.75 |
| Sodium stearate | 14.62 | 18.0 |

The resulting composition, which was harder in its physical form than the composition of Example 1 due to its comparatively greater concentration of sodium stearate, was applied to a sheet of conventional stationery-type paper to form a mark. The mark was removable by the conventional action of an ordinary pencil eraser.

EXAMPLE 3

A composition of the formulation indicated below was prepared in essentially the same manner as the composition of Example 1, the most significant difference being that HERCOLYN D 55 WKX was added to the mixture after the addition of TIZATE B and prior to the addition of FC-129 thereto.

| Material | % By Weight | Weight (g) |
| --- | --- | --- |
| NC-407 | 65.99 | 81.6 |
| Glycerine | 5.26 | 6.50 |
| TINOX WLE | 2.63 | 3.3 |
| TIZATE B | 2.35 | 2.9 |
| HERCOLYN D 55 WKX (anionic tackifier - dispersion of hydrogenated methyl ester of rosin) | 6.39 | 7.9 |
| FC-129 | 1.42 | 1.75 |
| UNISPERSE BP-1 | 1.42 | 1.75 |
| Sodium stearate | 14.56 | 18.0 |

The resulting composition was applied to a sheet of conventional stationery-type paper to form a mark. Due to the presence of the tackifier in the composition, the composition appeared to "grab" or "flow on" the surface of the paper better. The mark was removable by the conventional action of an ordinary pencil eraser.

EXAMPLE 4

A composition of the formulation indicated below was prepared in the same manner as the composition of Example 3.

| Material | % By Weight | Weight (g) |
| --- | --- | --- |
| NC-407 | 60.25 | 74.2 |
| Glycerine | 5.28 | 6.50 |
| TINOX WLE | 2.64 | 3.3 |
| TIZATE B | 2.35 | 2.9 |
| HERCOLYN D 55 WKX | 12.02 | 14.8 |
| FC-129 | 1.42 | 1.75 |
| UNISPERSE BP-1 | 1.42 | 1.75 |
| Sodium stearate | 14.62 | 18.0 |

The resulting composition appeared to make a more cohesive and more tightly packed stick than the composition of Example 3 due to its higher ratio of tackifier to rubber latex emulsion. The composition was applied to a sheet of conventional stationery-type paper to form a mark. The mark was removable by the conventional action of an ordinary pencil eraser.

EXAMPLE 5

A composition of the formulation indicated below was prepared in the same manner as the composition of Example 1.

| Material | % By Weight | Weight (g) |
| --- | --- | --- |
| NC-407 | 74.07 | 89 |
| Glycerine | 5.41 | 6.50 |
| TINOX WLE | 2.70 | 3.3 |
| TIZATE B | 2.41 | 2.9 |
| FC-129 | 1.46 | 1.75 |
| UNISPERSE BP-1 | 1.46 | 1.75 |
| Sodium stearate | 12.48 | 15.0 |

The resulting composition appeared to make a harder stick than the composition of Example 1 due to its comparatively greater concentration of sodium stearate. The composition was applied to a sheet of conventional stationery-type paper to form a mark. The mark was removable by the conventional action of an ordinary pencil eraser.

EXAMPLE 6

A composition of the formulation indicated below was prepared in the same manner as the composition of Example 3.

| Material | % By Weight | Weight (g) |
| --- | --- | --- |
| NC-407 | 61.76 | 74.20 |
| Glycerine | 5.41 | 6.50 |
| TINOX WLE | 2.70 | 3.25 |
| TIZATE B | 2.41 | 2.90 |
| HERCOLYN D 55 WKX | 12.32 | 14.80 |
| FC-129 | 1.46 | 1.75 |
| UNISPERSE BP-1 | 1.46 | 1.75 |
| Sodium stearate | 12.48 | 15.00 |

The resulting composition appeared to make a softer stick than the composition of Example 4 due to its comparatively lesser concentration of sodium stearate. The composition was applied to a sheet of conventional stationery-type paper to form a mark. The mark was removable by the conventional action of an ordinary pencil eraser.

EXAMPLE 7

A composition of the formulation indicated below was prepared in the same manner as the composition of Example 3.

| Material | % By Weight | Weight (g) |
| --- | --- | --- |
| NC-407 | 60.99 | 74.20 |
| Glycerine | 5.34 | 6.50 |
| TINOX WLE | 2.67 | 3.25 |
| TIZATE B | 2.38 | 2.90 |
| HERCOLYN D 55 WKX | 12.17 | 14.80 |
| FC-129 | 1.44 | 1.75 |
| UNISPERSE BP-1 | 1.44 | 1.75 |
| Sodium stearate | 13.56 | 16.50 |

The resulting composition, which had a sodium stearate concentration intermediate to that of the compositions of Examples 3 and 5, appeared to make a stick that was intermediate in hardness thereto. The composition was applied to a sheet of conventional stationery-type paper to form a mark. The mark was removable by the conventional action of an ordinary pencil eraser.

EXAMPLE 8

A composition of the formulation indicated below was prepared in the same manner as the composition of Example 3.

| Material | % By Weight | Weight (g) |
| --- | --- | --- |
| NC-407 | 54.91 | 66.80 |
| Glycerine | 5.34 | 6.50 |
| TINOX WLE | 2.67 | 3.25 |
| TIZATE B | 2.38 | 2.90 |
| HERCOLYN D 55 WKX | 18.25 | 22.20 |
| FC-129 | 1.44 | 1.75 |
| UNISPERSE BP-1 | 1.44 | 1.75 |
| Sodium stearate | 13.56 | 16.50 |

The resulting composition, which had a greater ratio of tackifier to rubber latex emulsion than the composition of Example 4, appeared to make a more cohesive and more tightly packed stick than did the composition of Example 4. The composition was applied to a sheet of conventional stationery-type paper to form a mark. The mark was removable by the conventional action of an ordinary pencil eraser.

EXAMPLE 9

A composition of the formulation indicated below was prepared in essentially the same manner as the composition of Example 8, the only differences being that a different colorant and a lower concentration of sodium stearate were used.

| Material | % By Weight | Weight (g) |
|---|---|---|
| NC-407 | 55.60 | 66.80 |
| Glycerine | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| ACID BLUE 9 (water soluble acid dye - triphenyl methane) | 1.46 | 1.75 |
| Sodium stearate | 12.48 | 15.00 |

The resulting composition, which had a comparatively lower sodium stearate concentration than the composition of Example 8, made a softer stick than did the composition of Example 8. The composition was applied to a sheet of conventional stationery-type paper to form a mark. The mark was not removable by the conventional action of an ordinary pencil eraser. This is consistent with Applicants' expectations because Applicants had expected the charged acid dye to associate preferentially with the aqueous phase, as opposed to the hydrophobic natural rubber phase, once the rubber latex emulsion broke.

EXAMPLE 10

A composition of the formulation indicated below was prepared in the same manner as the composition of Example 3.

| Material | % By Weight | Weight (g) |
|---|---|---|
| NC-407 | 55.60 | 66.80 |
| Glycerine | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| UNISPERSE BP-1 | 1.46 | 1.75 |
| Sodium stearate | 12.48 | 15.00 |

The resulting composition, which had a comparatively lesser concentration of sodium stearate than the composition of Example 8, appeared to make a softer stick than did the composition of Example 8. The composition was applied to a sheet of conventional stationery-type paper to form a mark. The mark was removable by the conventional action of an ordinary pencil eraser.

EXAMPLE 11

A composition of the formulation indicated below was prepared in essentially the same manner as the composition of Example 9, the only difference being that a different colorant was used.

| Material | % By Weight | Weight (g) |
|---|---|---|
| NC-407 | 55.41 | 66.80 |
| Glycerine | 5.39 | 6.50 |
| TINOX WLE | 2.70 | 3.25 |
| TIZATE B | 2.41 | 2.90 |
| HERCOLYN D 55 WKX | 18.42 | 22.20 |
| FC-129 | 1.46 | 1.75 |
| SOLVENT BLUE 70 (solvent soluble dye - phthalocyanine) | 0.33 | 0.40 |
| Sodium stearate | 12.44 | 15.00 |

The resulting composition was applied to a sheet of conventional stationery-type paper to form a mark. The mark was removable by the conventional action of an ordinary pencil eraser. This is consistent with Applicants' expectations because Applicants had expected the solvent soluble dye, which has limited solubility in water, to associate with the hydrophobic natural rubber once the rubber latex emulsion broke.

EXAMPLE 12

A composition of the formulation indicated below was prepared in essentially the same manner as the composition of Example 10, the only difference being that BUTOFAN NS 103 (a noncarboxylated styrene-butadiene emulsion—47% solids—Tg-(−)56° C.) was used instead of NC-407.

| Material | % By Weight | Weight (g) |
|---|---|---|
| BUTOFAN NS 103 | 55.60 | 66.80 |
| Glycerine | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| UNISPERSE BP-1 | 1.46 | 1.75 |
| Sodium stearate | 12.48 | 15.00 |

The resulting composition was applied to a sheet of conventional stationery-type paper to form a mark. The mark was removable by the conventional action of an ordinary pencil eraser.

EXAMPLE 13

A composition of the formulation indicated below was prepared in the same manner as the composition of Example 12.

| Material | % By Weight | Weight (g) |
|---|---|---|
| BUTOFAN NS 103 | 62.52 | 89.00 |
| Glycerine | 4.57 | 6.50 |
| TINOX WLE | 2.28 | 3.25 |
| TIZATE B | 2.04 | 2.90 |
| HERCOLYN D 55 WKX | 15.60 | 22.20 |
| FC-129 | 1.23 | 1.75 |
| UNISPERSE BP-1 | 1.23 | 1.75 |
| Sodium stearate | 10.54 | 15.00 |

The resulting composition, which formed a softer stick than did the composition of Example 12 due to its comparatively lesser ratio of resin to tackifier, was applied to a sheet of conventional stationery-type paper to form a mark. The mark was removable by the conventional action of an ordinary pencil eraser.

EXAMPLE 14

A composition of the formulation indicated below was prepared in essentially the same manner as the composition of Example 13, the primary difference being that DAREX 110L (a butadiene acrylonitrile styrene emulsion—40% solids—Tg-(−)38° C.) was used instead of BUTOFAN NS 103.

| Material | % By Weight | Weight (g) |
| --- | --- | --- |
| DAREX 110L | 62.52 | 89.00 |
| Glycerine | 4.57 | 6.50 |
| TINOX WLE | 2.28 | 3.3 |
| TIZATE B | 2.04 | 2.9 |
| HERCOLYN D 55 WKX | 15.60 | 22.20 |
| FC-129 | 1.23 | 1.75 |
| UNISPERSE BP-1 | 1.23 | 1.75 |
| Sodium stearate | 10.54 | 15.00 |

The resulting composition was applied to a sheet of conventional stationery-type paper to form a mark. The mark was removable by the conventional action of an ordinary pencil eraser.

EXAMPLE 15

A composition of the formulation indicated below was prepared in essentially the same manner as the composition of Example 14, the only difference being that DAREX 165L (a carboxylated styrene acrylonitrile emulsion—50% solids—Tg-(+)102° C.) was used instead of DAREX 110L.

| Material | % By Weight | Weight (g) |
| --- | --- | --- |
| DAREX 165L | 62.52 | 89.00 |
| Glycerine | 4.57 | 6.50 |
| TINOX WLE | 2.28 | 3.3 |
| TIZATE B | 2.04 | 2.9 |
| HERCOLYN D 55 WKX | 15.60 | 22.20 |
| FC-129 | 1.23 | 1.75 |
| UNISPERSE BP-1 | 1.23 | 1.75 |
| Sodium stearate | 10.54 | 15.00 |

The resulting composition was applied to a sheet of conventional stationery-type paper to form a mark. The mark was removable by the conventional action of an ordinary pencil eraser. This is consistent with Applicants' expectations because Applicants had expected the pigment to associate with the charged resin, as opposed to the water phase, once the emulsion broke.

EXAMPLE 16

A composition of the formulation indicated below was prepared in essentially the same manner as the composition of Example 15, the only difference being that BUTOFAN NS 222 (a carboxylated styrene-butadiene emulsion—51% solids—Tg-(−)36° C.) was used instead of DAREX 165L.

| Material | % By Weight | Weight (g) |
| --- | --- | --- |
| BUTOFAN NS 222 | 62.52 | 89.00 |
| Glycerine | 4.57 | 6.50 |
| TINOX WLE | 2.28 | 3.3 |
| TIZATE B | 2.04 | 2.9 |
| HERCOLYN 55 WKX | 15.60 | 22.20 |
| FC-129 | 1.23 | 1.75 |
| UNISPERSE BP-1 | 1.23 | 1.75 |
| Sodium stearate | 10.54 | 15.00 |

The resulting composition was applied to a sheet of conventional stationery-type paper to form a mark. The mark was removable by the conventional action of an ordinary pencil eraser. (Erasability was greatest immediately after the mark was made; after 24 hours, erasability had markedly decreased.) Erasability is consistent with Applicants' expectations because Applicants had expected the pigment to preferentially associate with the resin, as opposed to the aqueous phase, once the emulsion broke.

EXAMPLE 17

A composition of the formulation indicated below was prepared in essentially the same manner as the composition of Example 16, the primary difference being that ACRYNOL DS 3421 (an acrylic emulsion—55% solids—Tg-(−)60° C.) was used instead of BUTOFAN NS 222.

| Material | % By Weight | Weight (g) |
| --- | --- | --- |
| ACRYNOL DS 3421 | 62.52 | 89.00 |
| Glycerine | 4.57 | 6.50 |
| TINOX WLE | 2.28 | 3.25 |
| TIZATE B | 2.04 | 2.90 |
| HERCOLYN D 55 WKX | 15.60 | 22.20 |
| FC-129 | 1.23 | 1.75 |
| UNISPERSE BP-1 | 1.23 | 1.75 |
| Sodium stearate | 10.54 | 15.00 |

The resulting composition was applied to a sheet of conventional stationery-type paper to form a mark. The mark was removable by the conventional action of an ordinary pencil eraser. Erasability is consistent with Applicants' expectations because Applicants had expected the pigment to preferentially associate with the resin, as opposed to the aqueous phase, once the emulsion broke.

EXAMPLE 18

A composition of the formulation indicated below was prepared in the same manner as the composition of Example 12.

| Material | % By Weight | Weight (g) |
| --- | --- | --- |
| BUTOFAN NS 103 | 55.14 | 66.80 |
| Glycerine | 5.37 | 6.50 |
| TINOX WLE | 2.68 | 3.25 |
| TIZATE B | 2.39 | 2.90 |
| HERCOLYN D 55 WKX | 18.32 | 22.20 |
| FC-129 | 1.44 | 1.75 |
| UNISPERSE BP-1 | 1.44 | 1.75 |
| Sodium stearate | 13.21 | 16.00 |

The resulting composition, which formed a harder stick than did the composition of Example 12 due to its comparatively greater sodium stearate concentration, was applied to a sheet of conventional stationery-type paper to form a mark. The mark was removable by the conventional action of an ordinary pencil eraser.

EXAMPLE 19

A composition of the formulation indicated below was prepared in the same manner as the composition of Example 18.

| Material | % By Weight | Weight (g) |
| --- | --- | --- |
| BUTOFAN NS 103 | 54.69 | 66.80 |
| Glycerine | 5.32 | 6.50 |
| TINOX WLE | 2.66 | 3.25 |
| TIZATE B | 2.37 | 2.90 |
| HERCOLYN D 55 WKX | 18.37 | 22.20 |
| FC-129 | 1.43 | 1.75 |
| UNISPERSE BP-1 | 1.43 | 1.75 |
| Sodium stearate | 13.92 | 17.00 |

The resulting composition, which formed a harder stick than did the composition of Example 18 due to its comparatively greater sodium stearate concentration, was applied to a sheet of conventional stationery-type paper to form a mark. The mark was removable by the conventional action of an ordinary pencil eraser.

EXAMPLE 20

A composition of the formulation indicated below was prepared in essentially the same manner as the composition of Example 12, the only difference being that SORBITOL NF (solid) was used instead of glycerine as the humectant.

| Material | % By Weight | Weight (g) |
| --- | --- | --- |
| BUTOFAN NS 103 | 55.60 | 66.80 |
| SORBITOL NF (solid) | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| UNISPERSE BP-1 | 1.46 | 1.75 |
| Sodium stearate | 12.48 | 15.00 |

The resulting composition was applied to a sheet of conventional stationery-type paper to form a mark. The mark was removable by the conventional action of an ordinary pencil eraser.

EXAMPLE 21

A composition of the formulation indicated below was prepared in essentially the same manner as the composition of Example 20, the only difference being that SORBITOL 70% (in water) was used instead of SORBITOL NF (solid) as the humectant.

| Material | % By Weight | Weight (g) |
| --- | --- | --- |
| BUTOFAN NS 103 | 55.60 | 66.80 |
| SORBITOL 70% (in water) | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| UNISPERSE BP-1 | 1.46 | 1.75 |
| Sodium stearate | 12.48 | 15.00 |

The resulting composition was applied to a sheet of conventional stationery-type paper to form a mark. The mark was removable by the conventional action of an ordinary pencil eraser.

EXAMPLE 22

A composition of the formulation indicated below was prepared in essentially the same manner as the composition of Example 21, the only difference being that triethanolamine was used instead of SORBITOL 70% (in water) as the humectant.

| Material | % By Weight | Weight (g) |
| --- | --- | --- |
| BUTOFAN NS 103 | 55.60 | 66.80 |
| triethanolamine | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| UNISPERSE BP-1 | 1.46 | 1.75 |
| Sodium stearate | 12.48 | 15.00 |

The resulting composition was applied to a sheet of conventional stationery-type paper to form a mark. The mark was removable by the conventional action of an ordinary pencil eraser.

EXAMPLE 23

A composition of the formulation indicated below was prepared in essentially the same manner as the composition of Example 22, the only difference being that propylene glycol was used instead of triethanolamine as the humectant.

| Material | % By Weight | Weight (g) |
| --- | --- | --- |
| BUTOFAN NS 103 | 55.60 | 66.80 |
| propylene glycol | 5.41 | 6.50 |
| TINOX WLE | 2.70 | 3.25 |
| TIZATE B | 2.41 | 2.90 |
| HERCOLYN D 55 WKX | 18.48 | 22.20 |
| FC-129 | 1.46 | 1.75 |
| UNISPERSE BP-1 | 1.46 | 1.75 |
| Sodium stearate | 12.48 | 15.00 |

The resulting composition was applied to a sheet of conventional stationery-type paper to form a mark. The mark was removable by the conventional action of an ordinary pencil eraser.

EXAMPLE 24

A composition of the formulation indicated below was prepared in essentially the same manner as the composition of Example 19, the only difference being that a different water-insoluble pigment was used as the colorant.

| Material | % By Weight | Weight (g) |
| --- | --- | --- |
| BUTOFAN NS 103 | 54.69 | 66.80 |
| Glycerine | 5.32 | 6.50 |
| TINOX WLE | 2.66 | 3.25 |
| TIZATE B | 2.37 | 2.90 |
| HERCOLYN D 55 WKX | 18.17 | 22.20 |
| FC-129 | 1.43 | 1.75 |
| UNISPERSE BP-1 (yellow) | 1.43 | 1.75 |
| Sodium stearate | 13.92 | 17.00 |

The resulting composition was applied to a sheet of conventional stationery-type paper to form a mark. The mark was removable by the conventional action of an ordinary pencil eraser.

EXAMPLE 25

A composition of the formulation indicated below was prepared in essentially the same manner as the composition of Example 24, the only difference being that a different water-insoluble pigment was used as the colorant.

| Material | % By Weight | Weight (g) |
| --- | --- | --- |
| BUTOFAN NS 103 | 54.69 | 66.80 |
| Glycerine | 5.32 | 6.50 |
| TINOX WLE | 2.66 | 3.25 |
| TIZATE B | 2.37 | 2.90 |
| HERCOLYN D 55 WKX | 18.17 | 22.20 |
| FC-129 | 1.43 | 1.75 |
| UNISPERSE RBS-P1 (red) | 1.43 | 1.75 |
| Sodium stearate | 13.92 | 17.00 |

The resulting composition was applied to a sheet of conventional stationery-type paper to form a mark. The mark was removable by the conventional action of an ordinary pencil eraser.

EXAMPLE 26

A composition of the formulation indicated below was prepared in essentially the same manner as the composition of Example 15, the primary difference being that a cationic basic dye (IA-33) was used instead of a water-insoluble pigment.

| Material | % By Weight | Weight (g) |
| --- | --- | --- |
| DAREX 165L | 55.30 | 66.80 |
| Glycerine | 5.38 | 6.50 |
| TINOX WLE | 2.69 | 3.3 |
| TIZATE B | 2.40 | 2.9 |
| HERCOLYN D 55 WKX | 18.38 | 22.20 |
| FC-129 | 1.45 | 1.75 |
| IA-33 | 0.33 | 0.40 |
| Sodium stearate | 14.07 | 17.00 |

The resulting composition was applied to a sheet of conventional stationery-type paper to form a mark. The mark was removable by the conventional action of an ordinary pencil eraser. This is consistent with Applicants' expectations because Applicants had expected the cationic dye to associate with the charged resin, as opposed to the water phase, once the emulsion broke.

EXAMPLE 27

A composition of the formulation indicated below was prepared in essentially the same manner as the composition of Example 26, the primary difference being that BUTOFAN NS 222 was used instead of DAREX 165L.

| Material | % By Weight | Weight (g) |
| --- | --- | --- |
| BUTOFAN NS 222 | 55.30 | 66.80 |
| Glycerine | 5.38 | 6.50 |
| TINOX WLE | 2.69 | 3.3 |
| TIZATE B | 2.40 | 2.9 |
| HERCOLYN D 55 WKX | 18.38 | 22.20 |
| FC-129 | 1.45 | 1.75 |
| IA-33 | 0.33 | 0.40 |
| Sodium stearate | 14.07 | 17.00 |

The resulting composition was applied to a sheet of conventional stationery-type paper to form a mark. The mark was removable by the conventional action of an ordinary pencil eraser. This is consistent with Applicants' expectations because Applicants had expected the cationic dye to associate with the charged resin, as opposed to the water phase, once the emulsion broke.

EXAMPLE 28

A composition of the formulation indicated below was prepared in essentially the same manner as the composition of Example 1, the primary difference being that sodium palmitate, generated by reacting NaOH and HYSTRENE 9014 (palmitic acid), was used as the gelling agent, instead of sodium stearate.

| Material | % By Weight | Weight (g) |
| --- | --- | --- |
| NC-407 | 55.74 | 66.80 |
| Glycerine | 5.42 | 6.50 |
| TINOX WLE | 2.71 | 3.3 |
| TIZATE B | 2.42 | 2.9 |
| HERCOLYN D 55 WKX | 18.52 | 22.20 |
| FC-129 | 1.46 | 1.75 |
| UNISPERSE BP-1 | 1.46 | 1.75 |
| NaOH | 1.84 | 2.20 |
| HYSTRENE 9014 | 10.43 | 12.50 |

The resulting composition was incapable of gelling properly. Applicants believe that this is because the direct addition of NaOH to the other ingredients of the mixture had a deleterious effect on the latex.

EXAMPLE 29

A composition of the formulation indicated below was prepared in essentially the same manner as the composition of Example 28, the primary difference being that, in the present composition, HYSTRENE 9022-90 (a $C_{22}$ homolog of stearic acid) was used instead of HYSTRENE 9014.

| Material | % By Weight | Weight (g) |
| --- | --- | --- |
| NC-407 | 55.74 | 66.80 |
| Glycerine | 5.42 | 6.50 |
| TINOX WLE | 2.71 | 3.25 |
| TIZATE B | 2.42 | 2.90 |
| HERCOLYN D 55 WKX | 18.52 | 22.20 |
| FC-129 | 1.46 | 1.75 |
| UNISPERSE BP-1 | 1.46 | 1.75 |
| NaOH | 1.84 | 2.20 |
| HYSTRENE 9022-90 | 10.43 | 12.50 |

Like the composition of Example 28, the resulting composition was incapable of gelling properly. Once again, applicants believe that this is because the direct addition of NaOH to the other ingredients of the mixture had a deleterious effect on the latex.

EXAMPLE 30

A composition similar to that of Example 28 was prepared, the primary difference between the compositions of Examples 28 and 30 being that, in the composition of Example 30, NaOH was first reacted with the palmitic acid and the resultant sodium palmitate was then added to the other ingredients (the sodium palmitate constituting 10.43%, by weight, of the total composition). The resultant composition gelled properly and was used to make a mark on a sheet of conventional stationery-type paper. The mark was removable by the conventional action of an ordinary pencil eraser.

EXAMPLE 31

The composition of Example 19 was used to make a mark on a glass surface. The mark was removable by the conventional action of an ordinary pencil eraser.

EXAMPLE 32

The composition of Example 19 was used to make a mark on a glass surface. The mark was removable by wiping the surface with a tissue.

EXAMPLE 33

The composition of Example 19 was used to make a mark on a plastic surface. The mark was removable by the conventional action of an ordinary pencil eraser.

EXAMPLE 34

The composition of Example 19 was used to make a mark on a plastic surface. The mark was removable by wiping the surface with a tissue.

EXAMPLE 35

The composition of Example 19 was used to make a mark on a whiteboard surface. The mark was removable by the conventional action of an ordinary pencil eraser.

EXAMPLE 36

The composition of Example 19 was used to make a mark on a whiteboard surface. The mark was removable by wiping the surface with a tissue.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A marking composition that is erasable from both porous and non-porous marking substrates, said marking composition comprising:

(a) an emulsion, said emulsion comprising a discontinuous polymeric phase and a continuous aqueous phase, said emulsion being characterized in that, prior to being contacted with the surface of a porous or non-porous marking substrate, said emulsion exists in a stable first state whereas, upon being contacted with the surface of a porous or non-porous marking substrate, said emulsion is transformed into an unstable second state and said discontinuous polymeric phase rapidly agglomerates to form a deposit on the surface of the porous or non-porous marking substrate contacted therewith with low adhesion thereto, said polymeric phase constituting 25–50%, by weight, of the total composition;

(b) a colorant, said colorant being characterized by its association with said deposit when said emulsion is transformed into said second state, said colorant constituting 1–2%, by weight, of the total composition;

(c) a shape-giving gel-forming agent, said shape-giving gel-forming agent being a salt of an aliphatic carboxylic acid having from 8 to 36 carbon atoms, said shape-giving gel-forming agent constituting 10–15%, by weight, of the total composition;

(d) a tackifier, said tackifier constituting 0–40%, by weight, of the total composition;

(e) a humectant, said humectant constituting 0–6%, by weight, of the total composition;

(f) an antioxidant and/or combination antioxidant and antiozinant, said antioxidant and/or combination antioxidant and antiozinant constituting 0–6%, by weight, of the total composition; and (g) a fluorochemical surfactant, said fluorochemical surfactant constituting 0–1.5%, by weight, of the total composition.

2. The marking composition of claim 1 wherein said shape-giving gel-forming agent is selected from the group consisting of sodium stearate and sodium palmitate.

3. The marking composition of claim 1 wherein said colorant is a water-insoluble pigment or a solvent soluble dye.

4. The marking composition of claim 1 wherein said emulsion is an aqueous dispersion of a polymeric material selected from the group consisting of olefinic polymers, copolymers of olefins and diolefins, and condensation polymers.

5. The marking composition of claim 1 wherein said emulsion is an aqueous dispersion of a polymeric material selected from the group consisting of homopolymers and copolymers of acrylonitrile, butadiene, chloroprene, isoprene, styrene, vinyl chloride, vinylidene chloride, saturated or unsaturated diols or polyols, saturated or unsaturated dicarboxylic acids or esters, and diisocyanates.

6. The marking composition of claim 1 wherein said emulsion is an aqueous dispersion of a polymeric material selected from the group consisting of natural rubber, non-carboxylated styrene-butadiene, butadiene acrylonitrile styrene, carboxylated styrene acrylonitrile, carboxylated styrene butadiene and acrylic resins.

7. The marking composition of claim 6 wherein said emulsion is an aqueous dispersion of a polymeric material selected from the group consisting of natural rubber and noncarboxylated styrene-butadiene resins.

8. The marking composition of claim 7 wherein said colorant is selected from the group consisting of water-insoluble pigments and solvent soluble dyes.

9. The marking composition of claim 6 wherein said emulsion is an aqueous dispersion of a polymeric material selected from the group consisting of carboxylated styrene-butadiene and carboxylated styrene acrylonitrile and wherein said colorant is a cationic, water-soluble dye.

10. The marking composition of claim 1 wherein said tackifier is an anionic dispersion of a hydrogenated methyl ester of rosin, said tackifier constituting approximately 12–19%, by weight, of the total composition.

11. The marking composition as claimed in claim 1 wherein said emulsion is an aqueous dispersion of a polymeric material selected from the group consisting of homopolymers and copolymers of unsaturated hydrocarbons, unsaturated hydrocarbon acids, unsaturated hydrocarbon alcohols, unsaturated hydrocarbon aldehydes and unsaturated hydrocarbon ketones.

12. The marking composition as claimed in claim 4 wherein said condensation polymers are selected from the group consisting of polyesters, polyethers, polyamines, polyamides and polyurethanes.

* * * * *